(12) United States Patent
Zhang et al.

(10) Patent No.: US 11,371,118 B2
(45) Date of Patent: Jun. 28, 2022

(54) MATRICES CONTAINING LITHIUM ALUMINATES

(71) Applicant: DDP SPECIALTY ELECTRONIC MATERIALS US, LLC, Wilmington, DE (US)

(72) Inventors: Zheng Zhang, Shanghai (CN); Chunxia Costeux, Midland, MI (US)

(73) Assignee: DDP SPECIALTY ELECTRONIC MATERIALS US, LLC

( * ) Notice: Subject to any disclaimer, the term of this patent is extended or adjusted under 35 U.S.C. 154(b) by 127 days.

(21) Appl. No.: 16/490,626

(22) PCT Filed: Mar. 21, 2017

(86) PCT No.: PCT/CN2017/077440
§ 371 (c)(1),
(2) Date: Sep. 3, 2019

(87) PCT Pub. No.: WO2018/170721
PCT Pub. Date: Sep. 27, 2018

(65) Prior Publication Data
US 2020/0010926 A1    Jan. 9, 2020

(51) Int. Cl.
| | | |
|---|---|---|
| C22B 26/12 | (2006.01) | |
| B01J 39/19 | (2017.01) | |
| B01J 39/20 | (2006.01) | |
| C22B 3/42 | (2006.01) | |
| B01J 47/02 | (2017.01) | |

(52) U.S. Cl.
CPC .............. *C22B 26/12* (2013.01); *B01J 39/19* (2017.01); *B01J 39/20* (2013.01); *B01J 47/02* (2013.01); *C22B 3/42* (2013.01); *B01J 2220/46* (2013.01)

(58) Field of Classification Search
CPC .............................. B01J 20/04; B01J 20/046
See application file for complete search history.

(56) References Cited

U.S. PATENT DOCUMENTS

| | | | |
|---|---|---|---|
| 4,116,858 A | 9/1978 | Lee et al. | |
| 4,221,767 A | 9/1980 | Lee et al. | |
| 4,381,349 A * | 4/1983 | Lee | C01F 7/34 521/28 |
| 8,753,594 B1 | 6/2014 | Burba, III et al. | |
| 2012/0288426 A1* | 11/2012 | Rezkallah | B01J 39/04 423/179.5 |
| 2014/0239224 A1* | 8/2014 | Burba | B01J 20/3007 252/193 |

FOREIGN PATENT DOCUMENTS

| | | |
|---|---|---|
| CN | 102631897 A | 8/2012 |
| EP | 29253 A1 | 5/1981 |
| WO | 2015171109 A1 | 11/2015 |

OTHER PUBLICATIONS

Zvezdov, Angel & Zvezdova, Dilyana. (2011). New Type Filtration, Ion-Exchange, Sorption Small Multi Process Water Conditioning Device Used as a Multi Cell Water Deionizer. 10.5772/23158. (Year: 2011).*
PCT International Search Report for International Application No. PCT/CN2017/077440, International filing date Mar. 21, 2017, ISA/CN, Xia Yu authorized officer.

* cited by examiner

*Primary Examiner* — Ngoc-Yen Nguyen
(74) *Attorney, Agent, or Firm* — Carl P. Hemenway; Kenneth Criminaldi

(57) ABSTRACT

Provided is a particulate composition comprising a collection of resin beads and $LiX \cdot 2Al(OH)_3 \cdot nH_2O$, wherein n is 0 to 10, wherein X is a halogen,
  wherein the resin beads contain polymer having 0.5 to 3 equivalents of amine pendant groups per liter of the particulate composition,
  wherein the resin beads have average pore diameter of 5 to 100 nm,
  wherein the collection of resin beads has harmonic mean particle diameter of 200-1000 micrometers;
  wherein the collection of resin beads has surface area of 20 to 150 $m^2/g$;
  and wherein aluminum is present in an amount of 14.5% percent or higher, by weight of aluminum atoms based on the total weight of the particulate composition.
Also provided is a method of removing lithium from brine using such a composition.

1 Claim, No Drawings

MATRICES CONTAINING LITHIUM ALUMINATES

In processes for mining lithium, it is often desired to separate lithium from an aqueous brine solution when the brine solution contains one or more dissolved salts of lithium and also contains one or more dissolved salts of one or more other alkali metals and/or one or more dissolved salts of one or more alkaline earths. One method that could be considered for making such a separation would be to pass the brine through a bed of ion exchange resin particles; it would be desirable if lithium cations remained in the bed of ion exchange particles preferentially to the other cation(s) in the brine. Then the lithium could be removed from the ion exchange resin particles by passing an elution fluid through the bed of ion exchange resin particles. It is desirable that the ion exchange resin particles remove a large amount of the lithium from the brine. It is desirable that the ion exchange resin particles remove lithium from the brine far more efficiently than they remove other cations from the brine. It is also desirable that the ion exchange resin particles are able to undergo many cycles (that is, cycles of loading lithium by passing brine through the bed of particles followed by removal of lithium by passing an elution fluid through the bed of particles) without losing effectiveness at removing lithium from the brine.

U.S. Pat. No. 4,348,296 describes the possibility of selectively recovering $Li^+$ values from Li-containing brines using a macroporous ion exchange resin that has been loaded with $LiX.2Al(OH)3.nH2O$, where X is an anion or negative-valence salt radical and n is the number of waters of hydration.

It is desired to provide an improved system for removing lithium from brine. Desirably, the improved system has improved effectiveness at removing lithium and has an acceptable ability to withstand many cycles of loading lithium followed by removal of lithium.

The following is a statement of the invention.

A first aspect of the present invention is a particulate composition comprising a collection of resin beads and $LiX.2Al(OH)3.nH2O$, wherein n is 0 to 10, wherein X is a halogen; wherein the resin beads contain polymer having 0.5 to 3 equivalents of amine pendant groups per liter of the particulate composition; wherein the resin beads have average pore diameter of 5 to 100 nm; wherein the collection of resin beads has harmonic mean particle diameter of 200-1000 micrometers; wherein the collection of resin beads has surface area of 20 to 150 m2/g; and wherein aluminum is present in an amount of 14.5% percent or higher, by weight of aluminum atoms based on the total weight of the particulate composition.

A second aspect of the present invention is a method of removing lithium from a brine, wherein the brine comprises dissolved lithium cations in an amount of 50 ppm or more of lithium based on the weight of the brine; wherein the brine contains dissolved cations of magnesium, with a mass ratio of magnesium to lithium of 50:1 to 500:1; wherein the method comprises passing the brine through a fixed bed of the particulate composition of claim 1.

The following is a detailed description of the invention.

As used herein, the following terms have the designated definitions, unless the context clearly indicates otherwise.

As used herein, an aqueous solution is a solution of one or more compound dissolved in a solvent, where the solvent contains water, and where the solvent contains 80% or more water by weight, based on the weight of the solvent.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have a non-aromatic carbon-carbon double bond that is capable of participating in a free-radical polymerization process. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. "Substituted" means having at least one attached chemical group such as, for example, alkyl group, alkenyl group, vinyl group, hydroxyl group, alkoxy group, carboxylic acid group, amine groups, other functional groups, and combinations thereof.

As used herein, vinyl aromatic monomers are vinyl monomers that contain one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A polymer in which 90% or more of the polymerized units, by weight based on the weight of the polymer, are polymerized units of one or more vinyl monomers is a vinyl polymer. A vinyl aromatic polymer is a vinyl polymer in which 50% or more of the polymerized units, by weight based on the weight of the polymer, are polymerized units of one or more vinyl aromatic monomer.

In some embodiments, a polymer is made by polymerization of monomers that included one or more vinyl aromatic monomer (such as, for example, styrene). In some of such embodiments, after polymerization, that polymer is altered by a chemical reaction that attaches one or more functional group (such as, for example, an alkylamine group) to a carbon atom on an aromatic ring of a polymerized unit of that vinyl aromatic monomer. Herein, the polymerized unit that was thus altered is still considered to be a polymerized unit of a vinyl aromatic monomer.

A resin is considered herein to be crosslinked if the polymer chain has sufficient branch points to render the polymer not soluble in any solvent. When it is said herein that a polymer is not soluble in a solvent, it means that less than 0.1 gram of the resin will dissolve in 100 grams of the solvent at 25° C.

Amine groups have either the free base structure $-NR^1R^2$, or the cation structure $-NR^1R^2H^+$, or a mixture thereof, where $R^1$ and $R^2$ are each independently hydrogen or substituted or unsubstituted hydrocarbyl groups. A polymer is said herein to have pendant amine groups if amine groups are covalently bonded to the polymer, either directly or through intervening linking groups.

A collection of particles is characterized by the diameters of the particles. If a particle is not spherical, the diameter of the particle is considered to be the diameter of a particle having the same volume as the particle. A collection of particles is characterized herein by the harmonic mean particle diameter (HMPD) of the collection, which is defined as $$HMPD = \frac{N}{\sum_{i=1}^{N} \left(\frac{1}{d_i}\right)}$$

where the collection has N particles, which are indexed by the letter i from 1 to N.

Resins may be characterized by the average pore diameter, which is measured by the BET method using nitrogen gas. As used herein, a "gel" resin has average pore diameter of 5 nm or less. As used herein, a "macroporous" resin has average pore diameter of greater than 20 nm. Resins may also be characterized by the surface area, which is also measured by the BET method using nitrogen gas.

When it is stated herein that a solution contains a particular dissolved ionic species, it is to be understood that the solution may or may not contain one or more ionic species of the same charge as the particular ionic species, and it is to be understood that the solution will contain sufficient ionic species of the charge opposite to the particular ionic species in order to achieve balance of electrical charges.

As used herein, brine is a solution of NaCl in water. Brine typically additionally contains one or more dissolved salts of one or more alkali metals other than Na, one or more dissolved salts of an alkaline earth, or a mixture thereof.

Ratios are characterized herein as follows. For example, if a ratio is said to be 3:1 or greater, that ratio may be 3:1 or 5:1 or 100:1 but may not be 2:1. As a general statement, when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. As a general statement, when a ratio is said herein to be W:1 or less, it is meant that the ratio is Z:1, where Z is less than or equal to W.

The composition of the present invention comprises a collection of resin beads and salt (a). Salt (a) is $LiX \cdot 2Al(OH)_3 \cdot nH_2O$, where X is a halogen, and n is the number of water molecules of hydration; n is from 0 to 10. The number n may be an average value over multiple molecules of salt (a). That is, the various molecules of salt (a) may possibly have various numbers of molecules of water of hydration in the various individual molecules of salt (a), and therefore the number n may or may not be an integer. X is preferably chlorine, bromine, fluorine, or a mixture thereof; more preferably chlorine.

Preferably, the amount of aluminum in the composition of the present invention is, by weight of all aluminum atoms, based on the weight of the composition of the present invention, 14.5% or more; more preferably 15% or more; more preferably 15.5% or more. Preferably, the amount of aluminum in the composition of the present invention is, by weight of all aluminum atoms, based on the weight of the composition of the present invention, 25% or less; more preferably 20% or less.

The resin beads contain polymer. Preferably the amount of polymer in the composition of the present invention is, by weight based on the weight of the composition of the present invention, 4% or more; more preferably 6% or more, more preferably 8% or more. Preferably the amount of polymer in the composition of the present invention is, by weight based on the weight of the composition of the present invention, 40% or less; more preferably 30% or less; more preferably 20% or less.

Preferably, the resin beads contain water. Preferably, the amount of water, by weight based on the weight of the resin beads, is 20% or more; more preferably 25% or more; more preferably 30% or more. Preferably, the amount of water, by weight based on the weight of the resin beads, 50% or less; more preferably 45% or less; more preferably 40% or less.

The polymer contains pendant amine groups. Preferably, each of $R^1$ and $R^2$ (as defined above) is independently a substituted or unsubstituted hydrocarbyl group; more preferably a substituted or unsubstituted alkyl group; more preferably an unsubstituted alkyl group. Preferably, each of $R^1$ and $R^2$ has 1 to 8 carbon atoms; more preferably 1 to 4 carbon atoms; more preferably 1 or 2 carbon atoms. Preferably $R^1$ and $R^2$ are the same as each other. Preferably, the mole percent of polymerized units of the polymer that contains an amine group is 50% or more; more preferably 70% or more.

Preferably, the pendant amine groups on the polymer are present in an amount that gives 0.5 or more equivalents of pendant amine groups per liter of the particulate composition (eq/L); more preferably 0.7 eq/L or more; more preferably 0.8 eq/L or more; more preferably 0.9 eq/L or more. Preferably, the pendant amine groups on the polymer are present in an amount that gives 3 eq/L or less; more preferably 2.6 eq/L or less; more preferably 2.2 eq/L or less; more preferably 1.8 eq/L or less.

Preferably, the polymer is a vinyl polymer; more preferably, the polymer is a vinyl aromatic polymer. Preferably, the mole percent of polymerized units of the polymer that are polymerized units of a vinyl aromatic monomer is 50% or more; more preferably 60% or more; more preferably 70% or more; more preferably 80% or more; more preferably 90% or more. Preferred vinyl aromatic monomers are styrene, alkyl styrenes, divinylbenzene, and mixtures thereof.

Preferably, the polymer contains polymerized units of one or more multivinyl monomers. More preferably, the polymer contains polymerized units of one or more multivinyl monomers and polymerized units of one or more monovinyl monomer.

The resin beads preferably have a porous structure. Preferably, the collection of resin beads has average pore diameter of 5 nm or higher; more preferably 10 nm or higher. Preferably, the collection of resin beads has average pore diameter of 100 nm or smaller; more preferably 70 nm or smaller; more preferably 50 nm or smaller; more preferably 30 nm or smaller.

The collection of resin beads preferably has harmonic mean particle diameter of 200 micrometers or greater; more preferably 300 micrometers or greater; more preferably 350 micrometers or greater; more preferably 400 micrometers or greater. The collection of resin beads preferably has harmonic mean particle diameter of 1000 micrometers or less; more preferably 900 micrometers or less; more preferably 800 micrometers or less; more preferably 700 micrometers or less.

The collection of resin beads preferably has surface area of 20 $m^2/g$ or higher; more preferably 25 $m^2/g$ or higher; more preferably 30 $m^2/g$ or higher. The collection of resin beads preferably has surface area of 150 $m^2/g$ or lower; more preferably 100 m²/g or lower; more preferably 75 m²/g or lower; more preferably 50 m²/g or lower.

Preferably, lithium is present in the particulate composition of the present invention, as the total weight of all lithium atoms, based on the weight of the particulate composition, of 0.6% or higher; more preferably 0.8% or higher; more preferably 1% or higher. Preferably, lithium is present in the particulate composition of the present invention, as the total weight of all lithium atoms, based on the weight of the particulate composition, of 2% or lower; more preferably 1.8% or lower; more preferably 1.6% or lower.

It is contemplated that all or part of the salt (a) in the particulate composition of the present invention is in a location that is attached to the resin beads. The salt (a) may be located on the outer surface of the beads, in the interiors of the beads, in the pores in the beads, or any combination thereof. It is particularly expected that 50% or more by weight of the salt (a) is located in the pores in the resin beads. It is contemplated that some or all of the salt (a) that is present in the pores is present on the surfaces of the walls of the pores.

It is contemplated that salt (a) is present in crystalline form. In some embodiments, it is contemplated that the unit cell of the crystal contains both molecules of salt (a) and molecules of $Al(OH)_3$.

An aspect of the present invention is a process for making the particulate composition of the present invention. This process includes the step of depositing salt (a) into the pores of a preliminary particulate composition.

As used herein, a "preliminary particulate composition" is a particulate composition that contains a collection of resin beads having pendant amine groups and that does not contain aluminum or, if aluminum is present, the amount is less than 0.5% by weight of aluminum based on the weight of the preliminary particulate composition.

The preliminary particulate composition contains resin beads, herein called "preliminary resin beads." The preliminary resin beads contain polymer, herein referred to as "preliminary polymer." Preferably, the amount of preliminary polymer in the preliminary particulate composition is, by weight based on the weight of the preliminary particulate composition, 60% or more; more preferably 70% or more; more preferably 80% or more; more preferably 90% or more; more preferably 95% or more.

The preliminary polymer contains pendant amine groups. Preferably, each of $R^1$ and $R^2$ (as defined above) is independently a substituted or unsubstituted hydrocarbyl group; more preferably a substituted or unsubstituted alkyl group; more preferably an unsubstituted alkyl group. Preferably, each of $R^1$ and $R^2$ has 1 to 8 carbon atoms; more preferably 1 to 4 carbon atoms; more preferably 1 or 2 carbon atoms. Preferably $R^1$ and $R^2$ are the same as each other. Preferably, the mole percent of polymerized units of the polymer that contains an amine group is 50% or more; more preferably 70% or more.

Preferably, the pendant amine groups on the preliminary polymer are present in an amount that gives 0.5 or more equivalents of pendant amine groups per liter of the preliminary particulate composition (eq/L); more preferably 0.7 eq/L or more; more preferably 0.8 eq/L or more; more preferably 0.9 eq/L or more. Preferably, the pendant amine groups on the preliminary polymer are present in an amount that gives 3 eq/L or less; more preferably 2.6 eq/L or less; more preferably 2.2 eq/L or less; more preferably 1.8 eq/L or less.

Preferably, the preliminary polymer is a vinyl polymer; more preferably, the preliminary polymer is a vinyl aromatic polymer. Preferably, the mole percent of polymerized units of the preliminary polymer that are polymerized units of a vinyl aromatic monomer is 50% or more; more preferably 60% or more; more preferably 70% or more; more preferably 80% or more; more preferably 90% or more. Preferred vinyl aromatic monomers are styrene, alkyl styrenes, divinylbenzene, and mixtures thereof.

Preferably, the preliminary polymer contains polymerized units of one or more multivinyl monomers. More preferably, the preliminary polymer contains polymerized units of one or more multivinyl monomers and polymerized units of one or more monovinyl monomer.

The preliminary resin beads preferably have a porous structure. Preferably, the collection of resin beads has average pore diameter of 5 nm or higher. Preferably, the collection of resin beads has average pore diameter of 25 nm or smaller; more preferably 20 nm or smaller; more preferably 15 nm or smaller.

The collection of preliminary resin beads preferably has harmonic mean particle diameter of 200 micrometers or greater; more preferably 300 micrometers or greater; more preferably 350 micrometers or greater; more preferably 400 micrometers or greater. The collection of preliminary resin beads preferably has harmonic mean particle diameter of 1000 micrometers or less; more preferably 900 micrometers or less; more preferably 800 micrometers or less; more preferably 700 micrometers or less.

The collection of preliminary resin beads preferably has surface area of 20 m²/g or higher; more preferably 25 m²/g or higher; more preferably 30 m²/g or higher. The collection of preliminary resin beads preferably has surface area of 150 m²/g or lower; more preferably 100 m²/g or lower; more preferably 75 m²/g or lower; more preferably 50 m²/g or lower.

The preliminary particulate composition may be made by any method. In a preferred method, a copolymer is made from a mixture of monomers that lack amine groups. Preferred monomers are vinyl aromatic monomers; more preferred is a mixture of styrene, ethylvinylbenzene, and divinylbenzene. A preferred method of making the copolymer is aqueous suspension polymerization of the mixture of monomers, to form beads of copolymer.

Preferably, after polymerization, the copolymer is functionalized to add pendant amine groups. This functionalization is preferably performed by chloromethylation followed by amination. Chloromethylation is preferably performed by reacting the copolymer with a chloromethylation agent, such as, for example, chloromethyl methyl ether. The chloromethylated copolymer is preferably then reacted with an amine compound, with the result that amine groups are formed that are covalently bonded to the copolymer. Preferably, after the amination process, the result is a collection of resin beads having pendant amine groups, and this collection of resin beads is the collection of preliminary resin beads. The collection of preliminary resin beads preferably is the preliminary particulate composition.

After the preliminary particulate composition is made, salt (a) is deposited onto the particles. The depositing may be performed by any method. A suitable method is described by U.S. Pat. No. 4,348,296. In brief, the preliminary particulate composition is soaked in an aqueous solution of HCl, then drained, and the HCl solution is retained. Then the preliminary particulate composition was washed with water. The preliminary particulate composition is then soaked in saturated aqueous $AlCl_3$, then washed, then soaked in concentrated aqueous ammonia solution and then washed in water. The preliminary particulate composition is then soaked in aqueous NaOH solution and washed in water. Then 2NaAlO$_2$.NaOH is mixed with the retained HCl solution, and the mixture is added to the preliminary particulate composition, then the preliminary particulate composition is washed with water followed by aqueous NaCl solution, then soaked in aqueous NaCl solution. Then LiCl and LiOH are added, followed by further addition of aqueous NaCl solution and aqueous ammonia, then neutralized with aqueous HCl to a pH slightly below 7. The result is the particulate composition of the present invention.

One aspect of the present invention is a method of using the particulate composition of the present invention to remove lithium from a brine, by passing the brine through a bed of the particulate composition of the present invention.

The brine contains dissolved lithium in an amount, by weight of lithium based on the weight of the brine, of 50 ppm or more; more preferably 100 ppm or more; more preferably 150 ppm or more; more preferably 200 ppm or more.

The brine additionally contains dissolved cations of one or more of potassium, sodium, calcium, and magnesium, in a total amount of dissolved cations of potassium, sodium, calcium, and magnesium of, by weight, based on the weight of the brine, of 1% or more; preferably 2% or more; more preferably 4% or more; more preferably 6% or more. The brine preferably contains dissolved cations of one or more of potassium, sodium, calcium, and magnesium, in a total amount of dissolved cations of potassium, sodium, calcium, and magnesium of, by weight, based on the weight of the brine, of 20% or less; more preferably 16% or less; more preferably 12% or less.

Dissolved sodium ions are preferably present in the brine in an amount, by weight based on the weight of the brine, of 0.04% or more; more preferably 0.08% or more; more preferably 0.15% or more. Dissolved sodium ions are preferably present in the brine in an amount, by weight based on the weight of the brine, of 4% or less; more preferably 2% or less; more preferably 1% or less.

Dissolved calcium ions are preferably present in the brine in an amount, by weight based on the weight of the brine, of 0.004% or more; more preferably 0.008% or more; more preferably 0.015% or more. Dissolved calcium ions are preferably present in the brine in an amount, by weight based on the weight of the brine, of 0.4% or less; more preferably 0.2% or less; more preferably 0.1% or less.

Dissolved magnesium ions are preferably present in the brine in an amount, by weight based on the weight of the brine, of 1% or more; more preferably 2% or more; more preferably 4% or more. Dissolved magnesium ions are preferably present in the brine in an amount, by weight based on the weight of the brine, of 15% or less; more preferably 12% or less; more preferably 10% or less. Preferably the mass ratio of dissolved magnesium ions to dissolved lithium ions in the brine is 50:1 or higher; more preferably 100:1 or higher; more preferably 200:1 or higher. Preferably the mass ratio of dissolved magnesium ions to dissolved lithium ions in the brine is 500:1 or lower; more preferably 400:1 or lower.

Preferred anions in the brine are chloride, sulfate, and mixtures thereof; more preferred is a mixture of chloride and sulfate. When chloride and sulfate are both present, preferably the weight ratio of chloride to sulfate is 20:1 or higher; more preferably 50:1 or higher; more preferably 100:1 or higher; more preferably 200:1 or higher. When chloride and sulfate are both present, preferably the weight ratio of chloride to sulfate is 500:1 or lower; more preferably 450:1 or lower; more preferably 400:1 or lower.

The brine is passed through a bed of the particulate composition of the present invention. The "bed" refers to a sample of the particulate composition of the present invention that is held in place in a container that allows liquid to enter the container through an inlet, to flow through the container while making intimate contact with the particulate composition of the present invention, and then to exit the container through an outlet. A suitable bed of the particulate composition of the present invention is provided by packing a sample of the particulate composition of the present invention into a chromatography column.

The rate of passing brine through the bed is characterized by the bed volumes (BV) per hour. The bed volume is the volume of the particulate composition of the present invention held in the bed. Preferred rates of passing brine through the bed are 1 BV/hr or faster; more preferably 2 BV/hr or faster; more preferably 4 BV/hr or faster. Preferred rates of passing brine through the bed are 20 BV/hr or slower; more preferably 10 BV/hr or slower.

Preferably, while brine is passing through the bed, the brine and the bed have temperature of 25° C. or higher; more preferably 30° C. or higher; more preferably 35° C. Preferably, while brine is passing through the bed, the brine and the bed have temperature of 70° C. or less; more preferably 60° C.; more preferably 50° C.

It is expected that as the brine passes through the bed, that lithium will become adsorbed onto the particulate composition of the present invention, and that the total amount of all other cations adsorbed onto the particulate composition of the present invention will be much smaller than the amount of lithium that becomes adsorbed onto the particulate composition of the present invention. When one bed volume of brine has passed through the bed, the lithium preference ratio may be used to characterize the preferential adsorption of lithium. The lithium preference ratio is the ratio of the moles of lithium adsorbed from the brine onto the particulate composition of the present invention to the total moles of all other alkali metals and alkaline earths adsorbed from the brine onto the particulate composition of the present invention.

It is expected that, after a certain total amount of brine (which depends on the concentration of the brine, among other factors) has passed through the bed, the particulate composition of the present invention will become effectively saturated with lithium and will not be able to adsorb additional lithium.

Preferably, prior to saturation, when the particulate composition of the present invention has adsorbed one half or less of the lithium that it is capable of adsorbing, the lithium preference ratio (as defined above) is 2:1 or higher; more preferably 5:1 or higher; more preferably 10:1 or higher.

It is expected that after the particulate composition of the present invention is at or near saturation, it will be possible to regenerate the particulate composition of the present invention (i.e., remove some or all of the adsorbed lithium by passing one or more elution fluids through the bed). After regeneration, the bed of the particulate composition of the present invention could be used again for removing lithium from brine.

Preferably, after the passing of brine through the bed has been halted, the bed is washed with water to remove the brine. Preferably the water used for this washing process has total amount of dissolved salts, by weight, of 200 ppm or less; more preferably 100 ppm or less; more preferably 50 ppm or less. Preferably the amount of water used for this washing step is 1 BV to 5 BV. Preferably, the washing step is performed at a rate of 3 BV/hr or faster; more preferably 6 BV/hr or faster; more preferably 9 BV/hr or faster. Preferably, the washing step is performed at 15° C. to 30° C. Preferably, after this washing step, an elution fluid is passed through the bed.

Preferred elution fluids are aqueous solutions of lithium salts; more preferably solutions of lithium chloride. Preferably the amount of lithium in the elution fluid, by weight based on the weight of the elution fluid, is 100 ppm or more; more preferably 200 ppm or more. Preferably the amount of lithium in the elution fluid, by weight based on the weight of the elution fluid, is 1,000 ppm or less; more preferably 750 ppm or less; more preferably 500 ppm or less. Preferably the amount of all cations other than lithium in the elution fluid is, by weight, 50 ppm or less; more preferably 20 ppm or less; more preferably 10 ppm or less; more preferably 5 ppm or less.

Preferably the elution fluid is passed through the bed at a rate of 0.6 BV/hr or faster; more preferably 0.8 BV/hr or faster; more preferably 1 BV/hr or faster. Preferably the elution fluid is passed through the bed at a rate of 7 BV/hr or slower; more preferably 5 BV/hr or slower; more preferably 3 BV/hr or slower. Preferably, while elution fluid is passing through the bed, the elution fluid and the bed have temperature of 50° C. or higher; more preferably 60° C. or higher; more preferably 70° C. or higher; more preferably 80° C. or higher. Preferably, while elution fluid is passing through the bed, the elution fluid and the bed have temperature of 99° C. or lower; more preferably 95° C. or lower.

Preferably, the total amount of elution fluid passed through the bed is 1 BV or more; more preferably 2 BV or more. Preferably, the total amount of elution fluid passed through the bed is 10 BV or less; more preferably 6 BV or less; more preferably 4 BV or less.

It is contemplated that the elution fluid could be analyzed for lithium content as it exits the bed. It is expected that during the elution process, the concentration of lithium in the eluate (i.e., the elution fluid exiting the bed) will rise and then fall. It is contemplated that, when the concentration of lithium in the eluate has fallen to be the same as or nearly the same as the concentration of lithium in the elution fluid, all or nearly all of the available lithium has been removed from the bed. All of the eluate up to that point can be combined and processed further to remove the lithium.

It is contemplated that the particulate composition of the present invention could be used for multiple cycles of adsorbing lithium from brine and then releasing lithium to an elution fluid, without significant loss of the ability of the particulate composition of the present invention to adsorb lithium from brine. The particulate composition of the present invention could preferably be used for 15 or more such cycles; more preferably 20 or more such cycles; more preferably 25 or more such cycles.

The following are examples of the present invention. Unless otherwise stated, operations were performed at room temperature (approximately 23° C.); percentages are by weight; and solutions were aqueous.

EXAMPLE 1

Procedure for Depositing Salt (a) onto Preliminary Resin Particles

The procedure for depositing salt (a) onto preliminary resin particles was as follows. 1 liter of resin was covered with water to make total volume of 1200 mL. 200 mL of concentrated HCl was added; the mixture was stirred and allowed to stand overnight. Fluid was drained from the mixture using vacuum, and the resin was repeatedly rinsed with water. Resin was mixed with 1.5 L 30% $AlCl_3$ solution and stirred. Resin was drained using vacuum. 1 L of aqueous 30% by weight ammonia solution was added to the resin and stirred, then drained using vacuum, followed by washing with water. 1 L of 0.1N ammonium chloride was added and stirred, and the pH was adjusted to 10.5 to 11 with aqueous 1N NaOH, followed by washing with water. 25 mL of 1N NaOH and water were added, to give total volume of 1.6 L. The mixture was allowed to stand for 16 to 24 hours and then the resin was washed with water. Then $2NaAlO_2.NaOH$ was added in six lots of 167 g each. An aqueous solution of 36% HCl was added continuously. The resin was then washed with water. The resin was washed with 1.5 L aqueous 26% by weight solution of NaCl then stored in 2.2 L. Then 250 g LiCl was added; the mixture was stirred and then placed in an oven at 95° C. for 16 hours. At this point salt (a) was deposited onto the resin.

Then aqueous 26% by weight NaCl was added to make total volume of 2.2 L. The mixture was heated to 70° C. and 60 g of $NH_4Cl$ was added. The resin was titrated with aqueous 36% HCl followed by 1N HCl to pH of 5.

Three different preliminary resins were used. Their characteristics prior to deposition of salt (a) were as follows. PR-1C and PR-3C were comparative; PR-2 was an example. All three were vinyl aromatic polymers with pendant amine groups.

TABLE 1

Properties of Preliminary Resins

| Resin Number | Pore Diameter (nm) | Surface Area ($m^2$/g) | Amine Groups (equ/L) | Harmonic Mean Diameter (μm) |
| --- | --- | --- | --- | --- |
| PR-1C | 38 | 37 | 1.2 | 200-500 |
| PR-2 | 11 | 36 | 1.3 | 490-690 |
| PR-3C | 27 | 27 | 1.45 | 400-700 |

The three preliminary resins were treated as above to deposit salt (a).

EXAMPLE 2

Adsorption of Lithium from Brine Using Resins Made by the Process of Example 1

Each resin was exposed to brine. The brine was a water solution containing the following solutes: 0.32% by weight KCl; 0.82% by weight NaCl; 0.12% by weight $CaSO_4$; 31.2% by weight $MgCl_2$; and 1.58 g/L LiCl. The resin was exposed to brine using the following procedure. 30 ml of resin was loaded into a column with height of 180 mm. A level of 1 cm of deionized (DI) water was maintained over the surface of the resin. The column and the brine were heated to 40° C. Brine was loaded onto the top of the column and passed through the column at a rate of 6 BV/hr. Effluent was collected in samples of 2 BV each and analyzed for lithium content. After 50BV of brine passed through the column, the liquid was drained out of the column, leaving liquid level of 1 cm over the resin top surface.

The brine as it exits the column is known as the effluent. The lithium content of effluent samples was analyzed by atomic absorption spectroscopy.

The effectiveness of the treated resins at removal of lithium was assessed by measuring the lithium content of each sample of effluent. A lower concentration of lithium in the effluent demonstrates greater adsorption of lithium by the treated resin. The results were as follows.

TABLE 2

Concentration of Lithium in Effluent (ppm by weight)

| BV | PR-1C plus salt (a) | PR-2 plus salt (a) | PR-3C plus salt (a) |
|---|---|---|---|
| 2 | 99 | 27 | 43 |
| 4 | 75 | 18 | 119 |
| 6 | 97 | 39 | 118 |
| 10 | 125 | 93 | 156 |
| 16 | 145 | 120 | 157 |
| 22 | 156 | 138 | 169 |
| 26 | 191 | 151 | 142 |
| 30 | 173 | 154 | 172 |
| 34 | 170 | 175 | 166 |
| 38 | 188 | 177 | 186 |
| 44 | 174 | 166 | 191 |

Up to 30 BV, the inventive resin (PR-2 plus salt (a)) showed superior ability to adsorb lithium. After 30 BV, all three of the resins approached saturation.

EXAMPLE 3

Adsorption/Desorption Cycles with Treated Resin PR-2 Loaded with Salt (a)

After the adsorption process described in Example 2, the resin was subjected to a desorption process as follows:

The resin in the column was cooled to room temperature, then rinsed with 2 BV of DI water at 12 BV/hr. The resin in the column was heated to 90° C. An aqueous solution of LiCl having 300 ppm by weight lithium was also heated to 90° C. The resin in the column was then rinsed with the aqueous LiCl solution at 1.5 BV/hr. Samples were collected every 0.2 BV and analyzed for lithium content. A "cycle" is a combination of an adsorption process as described in Example 2 followed by a desorption process.

The PR-2 resin loaded with salt (a) was subjected to 29 cycles. In each cycle, the total amount of lithium adsorbed was over 4 g of lithium per liter of resin. The behavior during the desorption cycle is characterized by the desorption quotient, which is the quotient of the total amount of lithium desorbed during the desorption process divided by the total amount of lithium adsorbed during the adsorption process, expressed as a percentage. Over 13 cycles, the desorption quotients were as follows:

TABLE 3

Desorption Quotients

| Cycle 1 | Cycle 2 | Cycle 3 | Cycle 4 | Cycle 5 | Cycle 6 | Cycle 7 |
|---|---|---|---|---|---|---|
| 65% | 65% | 85% | 88% | 108% | 67% | 63% |

| Cycle 8 | Cycle 9 | Cycle 10 | Cycle 11 | Cycle 12 | Cycle 13 |
|---|---|---|---|---|---|
| 77% | 54% | 149% | 106% | 72% | 71% | the average desorption quotient was 82%. This consistent behavior during both adsorption and desorption over many cycles demonstrates that PR-2 loaded with salt (a) has the desired ability to maintain performance after multiple cycles.

The invention claimed is:

1. A method of making a particulate composition comprising depositing $LiX \cdot 2Al(OH)_3 \cdot nH_2O$, wherein n is 0 to 10, wherein X is a halogen, in the pores of a preliminary particulate composition, wherein the preliminary particulate composition comprises a collection of preliminary resin beads,
   wherein the preliminary resin beads contain polymer having 0.5 to 3 equivalents of amine pendant groups per liter of the preliminary particulate composition,
   wherein the preliminary resin beads have average pore diameter of 5 to 15 nm, as measured by the BET method using nitrogen gas,
   wherein the collection of preliminary resin beads has harmonic mean particle diameter of 200-1000 micrometers;
   wherein the collection of preliminary resin beads has surface area of 20 to 150 $m^2/g$.

* * * * *